US011118455B2

(12) United States Patent
Scherba

(10) Patent No.: US 11,118,455 B2
(45) Date of Patent: Sep. 14, 2021

(54) NIGHT VISION TUNNEL

(71) Applicant: Scherba Industries, Inc., Brunswick, OH (US)

(72) Inventor: Robert J. Scherba, Brunswick, OH (US)

( * ) Notice: Subject to any disclaimer, the term of this patent is extended or adjusted under 35 U.S.C. 154(b) by 0 days.

(21) Appl. No.: 16/740,071

(22) Filed: Jan. 10, 2020

(65) Prior Publication Data

US 2021/0215041 A1    Jul. 15, 2021

(51) Int. Cl.
| | |
|---|---|
| *E21D 9/14* | (2006.01) |
| *E04H 15/20* | (2006.01) |
| *E04B 1/343* | (2006.01) |
| *A63K 3/00* | (2006.01) |

(52) U.S. Cl.
CPC ............... *E21D 9/14* (2013.01); *A63K 3/00* (2013.01); *E04B 1/34347* (2013.01); *E04H 15/20* (2013.01); *E04H 2015/201* (2013.01); *E04H 2015/204* (2013.01)

(58) Field of Classification Search
CPC ......... E21D 9/14; A63K 3/00; E04B 1/34384; E04B 1/34347; E04H 15/20; E04H 2015/201; E04H 15/22; E04H 2015/204; B64G 2001/224; Y10S 52/13; A63B 2225/62
USPC .... 52/2.11, 2.17, 2.18, 2.23, 3, 23, DIG. 12, 52/DIG. 14; 135/97
See application file for complete search history.

(56) References Cited

U.S. PATENT DOCUMENTS

| | | | |
|---|---|---|---|
| 2,819,724 A * | 9/1952 | Barker | ..................... E04H 9/16 |
| | | | 52/2.18 |
| 3,250,024 A | 5/1966 | Douthitt | |
| 3,457,684 A | 7/1969 | Wood, Jr. | |
| 4,164,829 A | 8/1979 | Sadler | |
| 4,192,105 A * | 3/1980 | Morgan | .................. E04H 15/20 |
| | | | 52/2.25 |
| 4,738,057 A | 4/1988 | Logan | |
| 5,570,544 A | 11/1996 | Hale et al. | |
| 6,266,927 B1 | 7/2001 | Leslie | |
| 6,453,619 B1 | 9/2002 | Delamare | |
| 6,463,699 B1 | 10/2002 | Bailey et al. | |

(Continued)

FOREIGN PATENT DOCUMENTS

WO    WO2012168762    12/2012

*Primary Examiner* — Brent W Herring
(74) *Attorney, Agent, or Firm* — Emerson, Thomson & Bennett, LLC; Roger D. Emerson

(57) ABSTRACT

Provided in this disclosure is a portable night vision tunnel for operating a vehicle in a simulated night environment. The night vision tunnel is formed by assembling a plurality of modules on a driving surface to provide a darkened interior in which the vehicle can be driven. Each of the modules are formed of inflatable arch components each having a light-absorptive interior surface for creating the simulated night environment for operating the vehicle. A fastener arrangement connects each of the arch components to an adjoining one to form a single module. The tunnel includes a portal formed on an able arch component at a respective module proximate to the end of the tunnel. The portal admits the vehicle into the tunnel while maintaining the simulated night environment for operating the vehicle. An air circulation system ventilates and circulates air within an interior space of the tunnel.

17 Claims, 14 Drawing Sheets

(56) References Cited

U.S. PATENT DOCUMENTS

| | | | |
|---|---|---|---|
| 6,875,119 B2 * | 4/2005 | Murphy et al. | E04H 15/22 |
| | | | 472/134 |
| 8,955,258 B2 * | 2/2015 | Jacques | E04B 1/34357 |
| | | | 52/2.18 |
| 10,024,562 B2 * | 7/2018 | Chelf | F24F 7/007 |
| 10,132,100 B1 * | 11/2018 | Akad | A61F 7/0097 |
| 2002/0023390 A1 | 2/2002 | Nagle | |
| 2004/0204255 A1 * | 10/2004 | Murphy et al. | E04H 15/22 |
| | | | 472/134 |
| 2008/0313970 A1 * | 12/2008 | Turcot | E04H 15/20 |
| | | | 52/2.18 |
| 2009/0249701 A1 * | 10/2009 | Turcot | E04H 15/20 |
| | | | 52/2.18 |
| 2009/0320380 A1 * | 12/2009 | Chelf | A01G 9/242 |
| | | | 52/2.11 |
| 2010/0146868 A1 | 6/2010 | Lukasiewicz et al. | |
| 2013/0167452 A1 * | 7/2013 | Jacques | E04B 1/34357 |
| | | | 52/2.18 |
| 2015/0040487 A1 * | 2/2015 | Wiliams | B05B 16/40 |
| | | | 52/2.23 |
| 2015/0337526 A1 * | 11/2015 | Cantin | E04B 1/34357 |
| | | | 52/2.17 |
| 2018/0245362 A1 * | 8/2018 | Wibben | E04B 1/34336 |
| 2020/0079199 A1 * | 3/2020 | Blueford | E04H 15/20 |
| 2020/0299984 A1 * | 9/2020 | Williams | E04H 15/20 |

* cited by examiner

NIGHT VISION TUNNEL

I. BACKGROUND

A. Technical Field

The present invention pertains to the field of test-driving systems for road testing vehicles such as automobiles. In particular, the present invention pertains to portable test-driving systems for simulating night driving that can deployed at a temporary location and redeployed at a different temporary location.

B. Description of Related Art

Vehicle manufacturers perform road tests of vehicles to determine performance and safety factors under a range of conditions. In one example, it is important to test vehicles in darkness to determine visibility and other factors that influence vehicle operation under nighttime conditions.

In one instance, darkness road testing is typically performed at nighttime at an outdoor proving ground. However, this limits testing opportunities to only nighttime hours of operation, which can be inconvenient for vehicle drivers and testing personnel.

In another instance, darkness road testing can be performed at an indoor track at a physical facility at a designated location. Such a facility must be constructed in conformance with local codes and utility service requirements. This can entail considerable expense for construction and ongoing maintenance.

Moreover, such indoor road test facilities are only used intermittently since vehicles are not tested continuously at all times. Thus, such facilities can stand idle for long periods of time, still requiring continuous maintenance and utility service, resulting in additional ongoing expense.

Further, vehicle manufacturers require road testing services in several different locations around the United States and the world. Thus, it may be necessary to maintain multiple road test facilities in a variety of different locations, thereby multiplying the expense associated with facility construction and maintenance to maintain several facilities that largely sit unused for much of the time.

II. SUMMARY

Provided in this disclosure is a portable night vision tunnel for operating a vehicle in a simulated night environment. The night vision tunnel of the present invention is formed by assembling a plurality of modules that are arranged in a substantially abutting relationship on a driving surface. In this manner, the modules form the tunnel having a darkened interior in which the vehicle can be driven.

Each of the plurality of modules is formed of a plurality of inflatable arch components, each of which includes a top member that is supported by respective left and right vertical side supports. The arch components are dimensioned to allow a vehicle to pass thereunder. The inflatable arch components include a light-absorptive interior surface for creating the simulated night environment for operating the vehicle.

A fastener arrangement is configured around a periphery of each of the plurality of inflatable arch components. The fastener arrangement is provided for connecting each of the plurality of inflatable arch components to an adjoining one of the plurality of inflatable arch components to form a single one of the plurality of modules. Each resulting module formed thereby has a module top formed by respective adjoining top members of the plurality of arch components. Each module also includes module walls formed by respective adjoining side supports of the plurality of arch components.

The tunnel also includes a portal which is formed on a respective inflatable arch component at a respective module proximate to the end of the tunnel. The portal admits passage of the vehicle into the tunnel while maintaining the simulated night environment for operating the vehicle. There can be as many portals as ends of the tunnel, as will become clear from the further exposition of the present invention hereinbelow.

The night vision tunnel of the present invention also includes an air circulation system for ventilating and circulating air within an interior space of the tunnel. In this manner, the interior air can be refreshed from vehicle exhaust and cooled in order to reduce interior temperatures.

According to an aspect of the invention, the present night vision tunnel enables the testing of vehicles in darkness to determine visibility and other factors that influence vehicle operation under nighttime conditions.

According to another aspect of the invention, the present night vision tunnel enables darkness road testing to be performed at any time of day, thereby expanding testing opportunities for any hours of operation.

According to yet another aspect of the invention, the present night vision tunnel permits darkness road testing to be performed without the requirement of an indoor facility, resulting in a savings of expense for construction and ongoing maintenance.

According to still another aspect of the invention, the present night vision tunnel is portable and removes the need for permanent facilities that can stand idle for long periods of time, resulting in additional ongoing expense.

According to a further aspect of the invention, the present portable night vision tunnel can be moved and set up in multiple different locations, thereby eliminating the expense of maintaining multiple road test facilities in different locations.

Other benefits and advantages of this invention will become apparent to those skilled in the art to which it pertains upon reading and understanding of the following detailed specification.

III. BRIEF DESCRIPTION OF THE DRAWINGS

The disclosed night vision tunnel may take physical form in certain parts and arrangement of parts, embodiments of which will be described in detail in this specification and illustrated in the accompanying drawings which form a part hereof and wherein.

IV. DETAILED DESCRIPTION

Figure 1:
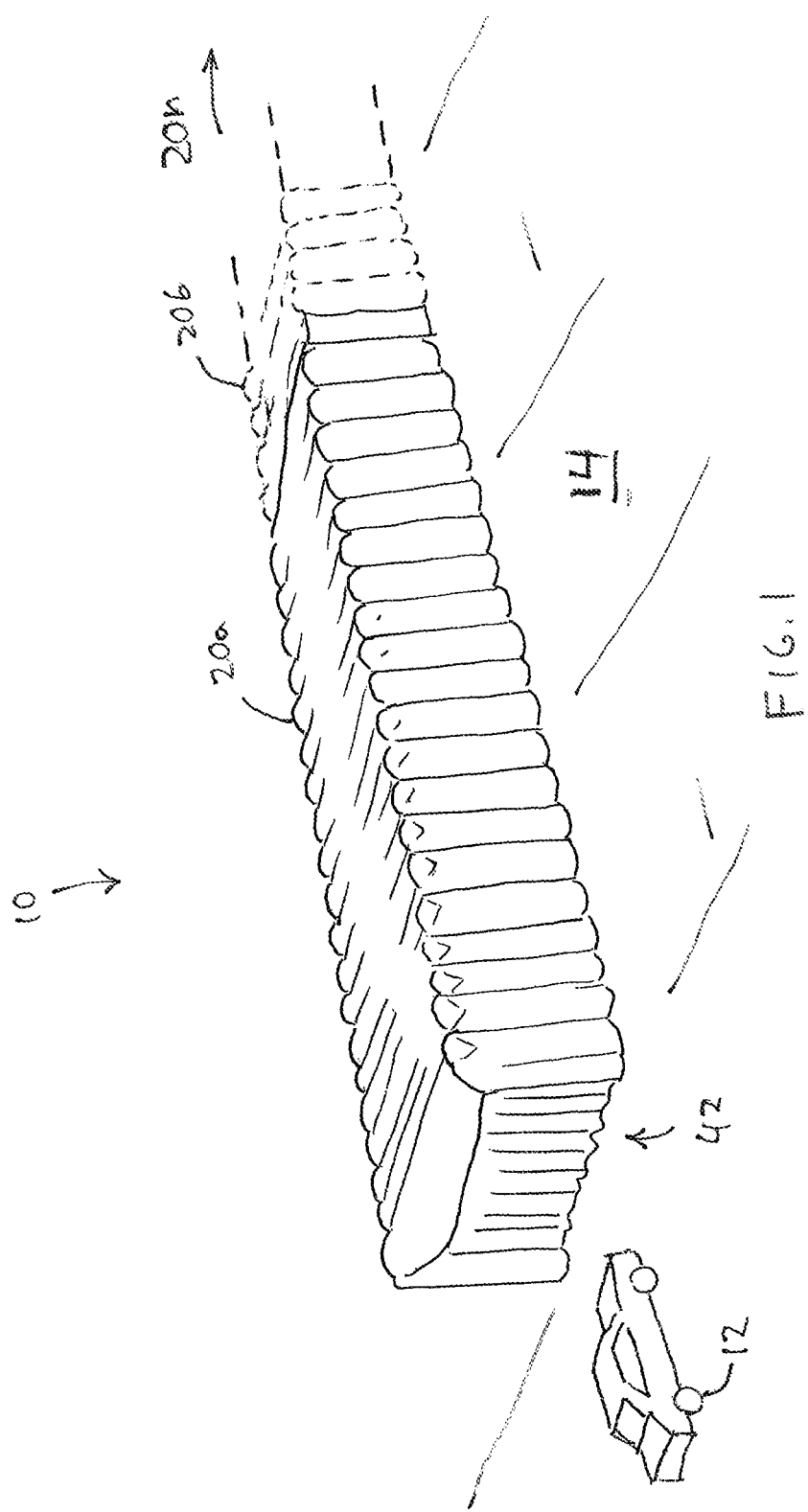
FIG. 1 is a perspective view of the night vision tunnel in accordance with an exemplary embodiment of the present invention.

Referring now to the drawings wherein the showings are for purposes of illustrating embodiments of the article only and not for purposes of limiting the same, and wherein like reference numerals are understood to refer to like components:

Turning now to the perspective view of FIG. 1, a night vision tunnel 10 is shown for admitting a vehicle 12 thereinto for operation in a simulated night environment. The tunnel 10 is formed of a plurality of modules, such as a first module 20a and a second module 20b as depicted in FIG. 1, where the second module 20b is shown as a partial view and in phantom. It is to be appreciated that the tunnel 10 can be of any desired length, and thereby formed of a plurality of modules 20a, 20b, . . . 20n of any desired length (where n indicates a selected number of modules). The plurality of modules 20a, 20b, . . . 20n are each arranged in a substantially abutting relationship, which is to say, end-to-end in such a way that an open end of a module abuts an open end of an adjoining module, to provide a continuous opening through which the vehicle 12 can be operated. The modules 20a, 20b, . . . 20n are arranged on a driving surface 14 (i.e., a road or other pavement) to form the tunnel 10, thus providing a darkened interior in which the vehicle 12 can be driven.

Figure 2:
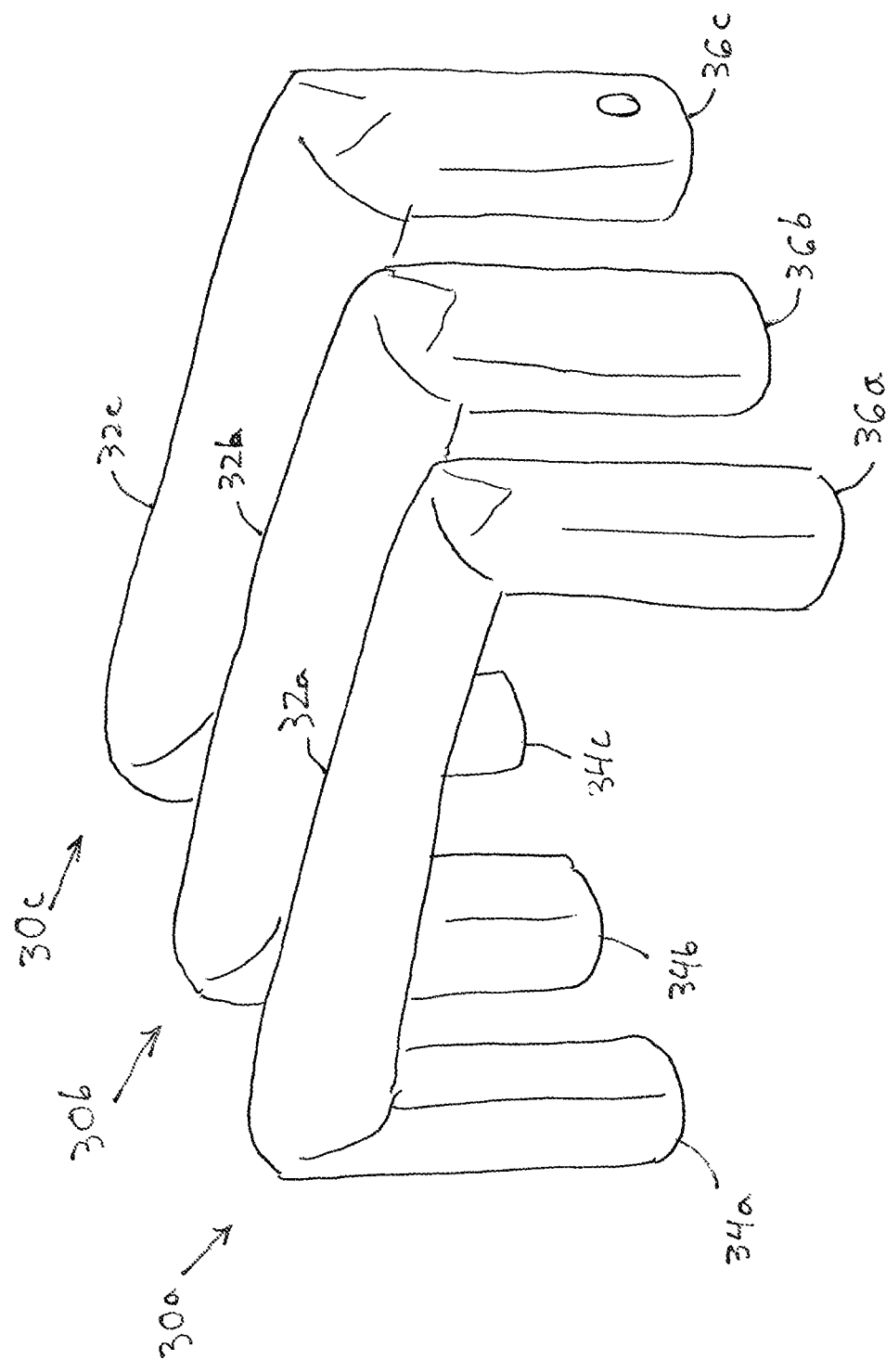
FIG. 2 is an exploded perspective view showing the assembly of a plurality of arch components in forming a module in accordance with an exemplary embodiment of the present invention.

The exploded perspective view of FIG. 2 shows a disassembled portion of an exemplary module 20, representative of each of the modules 20a, 20b, . . . 20n of the tunnel 10. The exemplary module 20 is assembled from a plurality of inflatable arch components 30a, 30b, 30c. In one aspect of the present invention, the exemplary module 20 can be formed of 21 arch components 30a, 30b, . . . 30u (where u is the letter corresponding to the number 21). However, the exemplary module 20 can alternatively be formed of any desired number of arch components 30a, 30b, . . . 30n (where n indicates a selected number of arch components).

Each of the inflatable arch components 30a, 30b, 30c include respective top members 32a, 32b, 32c which are supported by respective left vertical side supports 34a, 34b, 34c and right vertical side supports 36a, 36b, 36c. The respective top members 32a, 32b, 32c are preferably formed integrally with the respective left vertical side supports 34a, 34b, 34c and right vertical side supports 36a, 36b, 36c to each form respective, individual inflatable arch components 30a, 30b, 30c which are each individually inflated. However, the top members 32a, 32b, 32c, the left vertical side supports 34a, 34b, 34c and the right vertical side supports 36a, 36b, 36c can optionally be formed separately and inflated in separate sections and joined together.

The arch components 30a, 30b, 30c are dimensioned to allow the vehicle 12 to pass thereunder in the resulting module 20. In the preferred embodiment, each of the arch components 30a, 30b, 30c have interior dimensions so as to allow an automobile to easily pass underneath. However, it is to be appreciated that any other suitable interior dimensions can optionally be selected to enable any other class of vehicle to pass underneath for simulated night road testing.

With continuing reference to FIG. 2, each of the arch components 30a, 30b, 30c are formed of polyester material, such as that used in automobile 500 denier tire cord reinforcement. The polyester material is then covered on both sides with vinyl.

Figure 3:
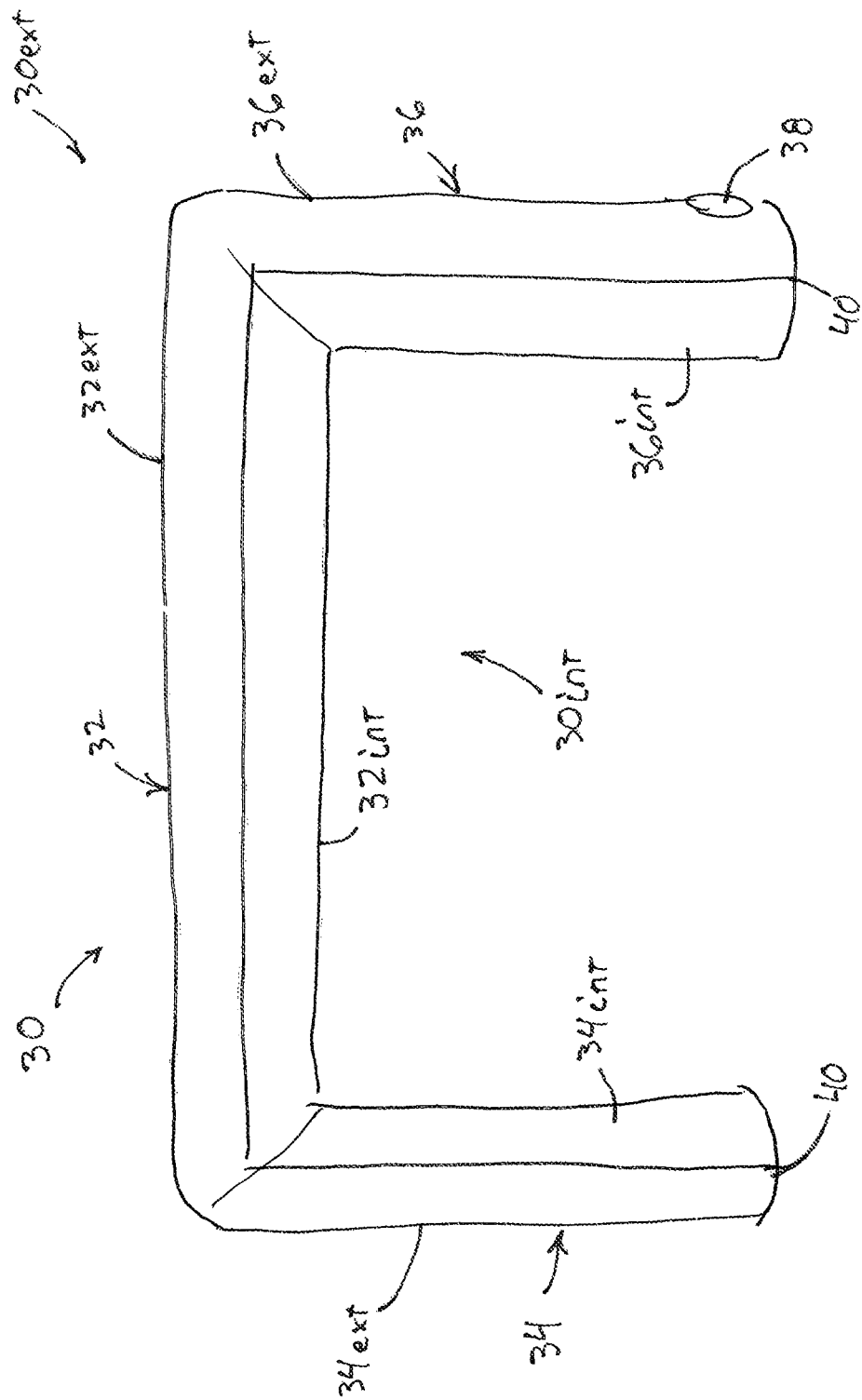
FIG. 3 is a frontal view of an exemplary arch component indicating construction details in accordance with an exemplary embodiment of the present invention.

With particular reference to the frontal view FIG. 3, an exemplary arch component 30 is shown that is representative of each of the arch components 30a, 30b, . . . 30n of the modules 20a, 20b, . . . 20n of the tunnel 10. The exemplary arch component 30 includes a respective top member 32, a left vertical side support 34 and a right vertical side support 36. The exemplary arch component 30 includes an interior side 30int formed of respective interior sides 32int, 34int, 36int of the top member 32 and the left and right vertical side supports 32, 34. The interior side 30int is a light-absorptive interior surface for creating the simulated night environment for operating the vehicle. The light-absorptive interior surface of the interior side 30int preferably includes a black, matte-finish fabric that absorbs light, such as black Cordura. The material is preferably made of a polyester cord material, such as that used in automobile 500 denier tire cord reinforcement. The polyester material is then covered on both sides with vinyl.

The night vision tunnel 10 of the present invention is a portable structure that can be set up outdoors and used in the daytime to simulate the nighttime environment in which the vehicles can be operated. In this regard, the exemplary arch component 30 includes an exterior side 30ext formed of respective interior sides 32ext, 34ext, 36ext of the top member 32 and the left and right vertical side supports 32, 34. The exterior side 30ext is a heat-reflective exterior surface for reducing heat when the tunnel is deployed out of doors during daylight. The wherein the heat-reflective exterior surface 30ext includes a grey vinyl material having a high coefficient of reflectance in the infrared region of the spectrum.

Also shown in FIG. 3 is an inflation port 38 for inflating the arch component 30. The inflation port 38 is connected to an air blower or other suitable device for supplying air flow to the arch component 30. The air flow is discontinued upon establishing a suitable internal air pressure within the arch component 30.

Figure 4:
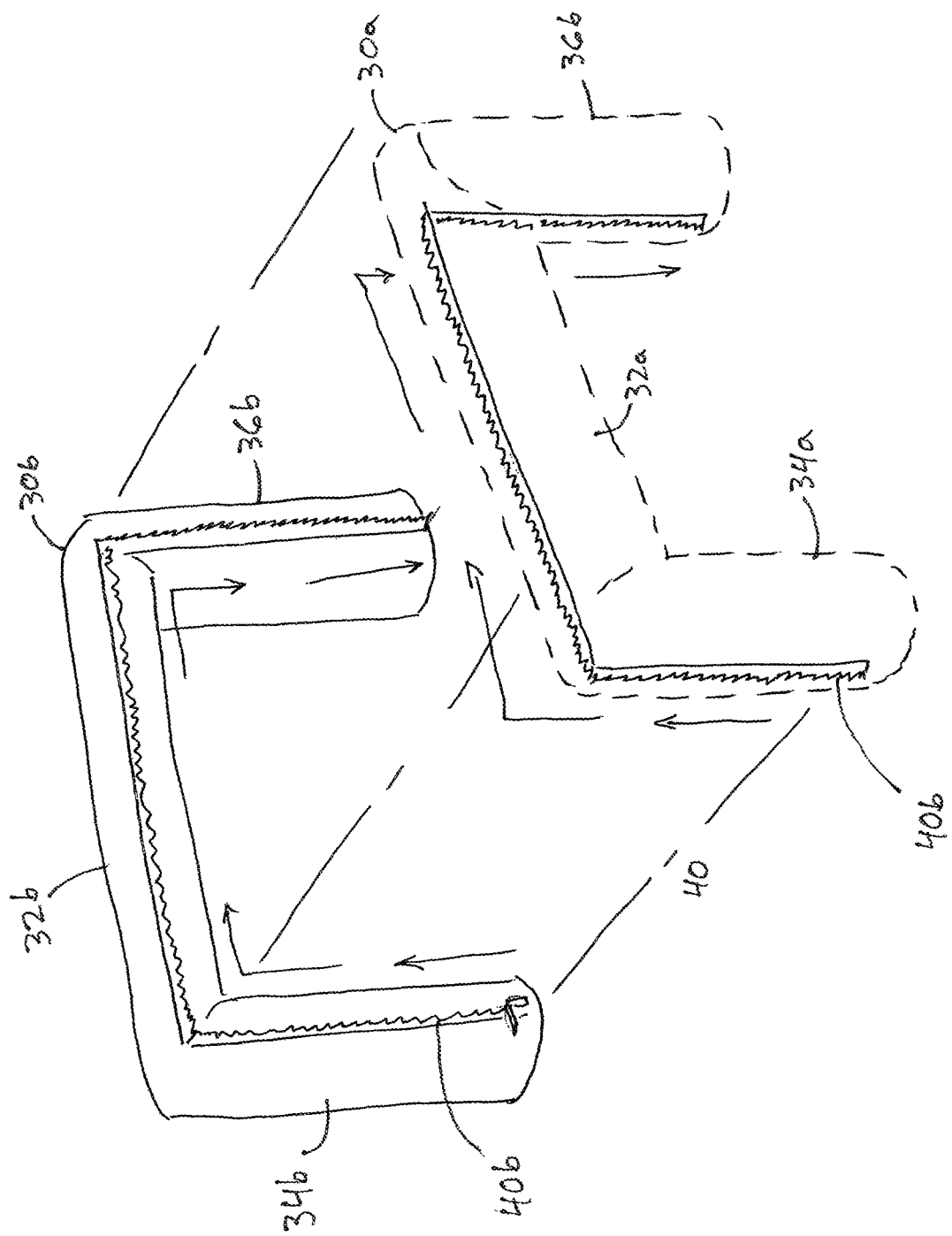
FIG. 4 is a perspective assembly view depicting the fastening of two adjoining arch components in accordance with an exemplary embodiment of the present invention.

FIG. 3 also generally indicates a fastener arrangement 40, which is shown in greater detail in the perspective assembly view of FIG. 4 depicting the fastening of two adjoining arch components 30a, 30b. The fastener arrangement 40 is configured around a periphery of each of the plurality of inflatable arch components 30a, 30b, for connecting each of the arch components 30a, 30b to an adjoining arch components 30a, 30b. The fastener arrangement 40 includes a first fastener portion 40a formed on an obverse side of each of the arch components 30a, 30b, and a second fastener portion 40b formed on a reverse side of each of the arch components 30a, 30b. Thus, each of the arch components 30a, 30b include respective first and second fastener portions 40a, 40b formed on opposite sides of the adjoining arch components 30a, 30b.

The separate fastener portions 40a, 40b are respectively joined together so that the observe side of an arch components 30a is connected to the reverse side of the adjoining arch component 30b. This process is repeated with respective adjoining arch components 30a, 30b, . . . 30n to form a single one of the plurality of modules 20a, 20b, . . . 20n. The resulting modules 20a, 20b, . . . 20n each have a module top formed by respective adjoining top members 32a, 32b, . . . 32n of the respective arch components 30a, 30b, . . . 30n. The resulting modules 20a, 20b, . . . 20n each also have left and right module walls formed by respective adjoining left and right vertical side supports 34a, 34b; 36a, 36b; . . . 34n, 36n of the respective arch components 30a, 30b, . . . 30n.

In the preferred embodiment, the fastener arrangement 40 includes fastener portions in the form of zipper portions 40a, 40b configured around the periphery of each of the plurality of inflatable arch components. The zipper portions 40a, 40b can be zipped to provide zipper engagement for connecting each of the plurality of inflatable arch components 30a, 30b, . . . 30n to an adjoining inflatable arch component 30a, 30b, . . . 30n. Though FIG. 4 only depicts a single fastener portion 40a, 40b on each of the illustrated inflatable arch components 30a, 30b, it is to be appreciated that each of the inflatable arch components 30a, 30b include a fastener portion 40a, 40b on both sides, to enable each inflatable arch component 30a, 30b to engage adjoining arch components.

As indicated in FIG. 4, the zipper portions 40a, 40b connect two adjoining arch components 30a, 30b along the respective left side supports 34a, 34b, continuing over the top members 32a, 32b and back down along the right side supports 36a, 36b. However, this order of zipping can be reversed or otherwise arranged differently. While the preferred embodiment includes zipper portions 40a, 40b, it is contemplated that other fastener arrangements could alternatively be contemplated, such as using hook and loop fasteners, a series of snaps or buttons, magnetic members, or any other types of fastener arrangements as would occur to those skilled in the art, all without departing from the invention.

Figure 5:
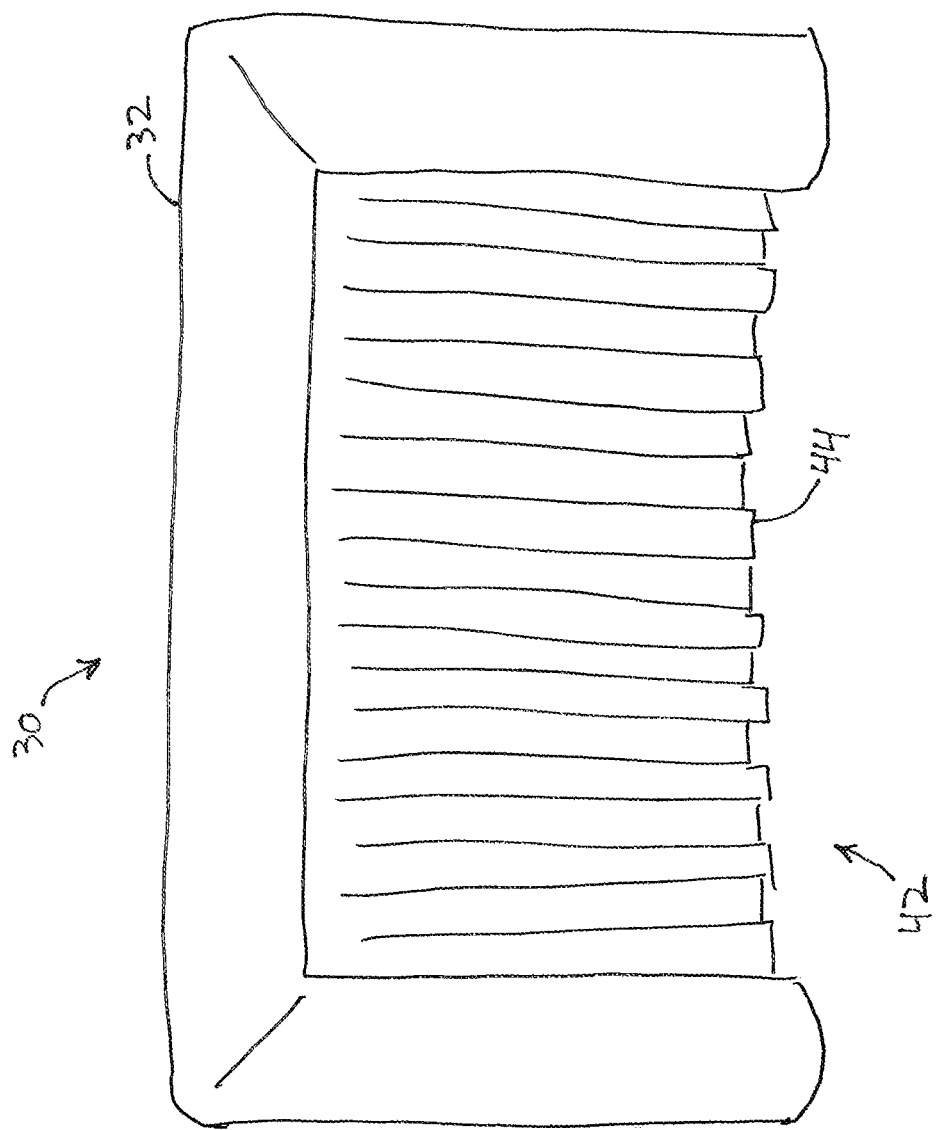
FIG. 5 is a frontal view of an exemplary arch component showing a portal in accordance with an exemplary embodiment of the present invention.

FIG. 5 is a frontal view of an exemplary arch component 30 that includes a portal 42 for admitting passage of the vehicle 12 into the tunnel 10. The portal 42 is formed on a respective inflatable arch component 30 located on a respective exemplary module 20 at a position proximate to the end of the tunnel 10, to function as an entrance and/or exit to the tunnel 10. The portal 42 can located on the last inflatable arch component at the end of a module that defines the end of the tunnel 10. Alternatively, the portal 42 can be formed on a selected arch component set back inwardly from the end of the tunnel 10, that is, two or three or more arch components from the end of the tunnel 10. It is to be appreciated that there can be more than one portal 42 at each of the openings to the tunnel 10, in accordance with a selected tunnel configuration, such as with the tunnel embodiments shown in FIGS. 13 and 14 hereinbelow.

The portal 42 is configured to admit passage of the vehicle 12 into the tunnel 10 while maintaining the simulated night environment for operating the vehicle 12. In one preferred embodiment, the portal 42 can include a strip curtain door 44 such as the type of opening often used with walk-in freezers to allow passage between a refrigerated region and an ambient temperature region without permitting a large exchange of air. The strip curtain door 44 can be formed of a black, matte-finish fabric that absorbs light, such as Cordura, as mentioned hereinabove. The strip curtain door 44 is configured to hang down from a top member 32 of the respective exemplary inflatable arch component 30 at or near the end of the respective exemplary module 20 at the end of the tunnel 10. In this manner, the strip curtain door 44 admits passage of the vehicle 12 into the tunnel 10 while maintaining the simulated night environment for operating the vehicle.

Figure 6:
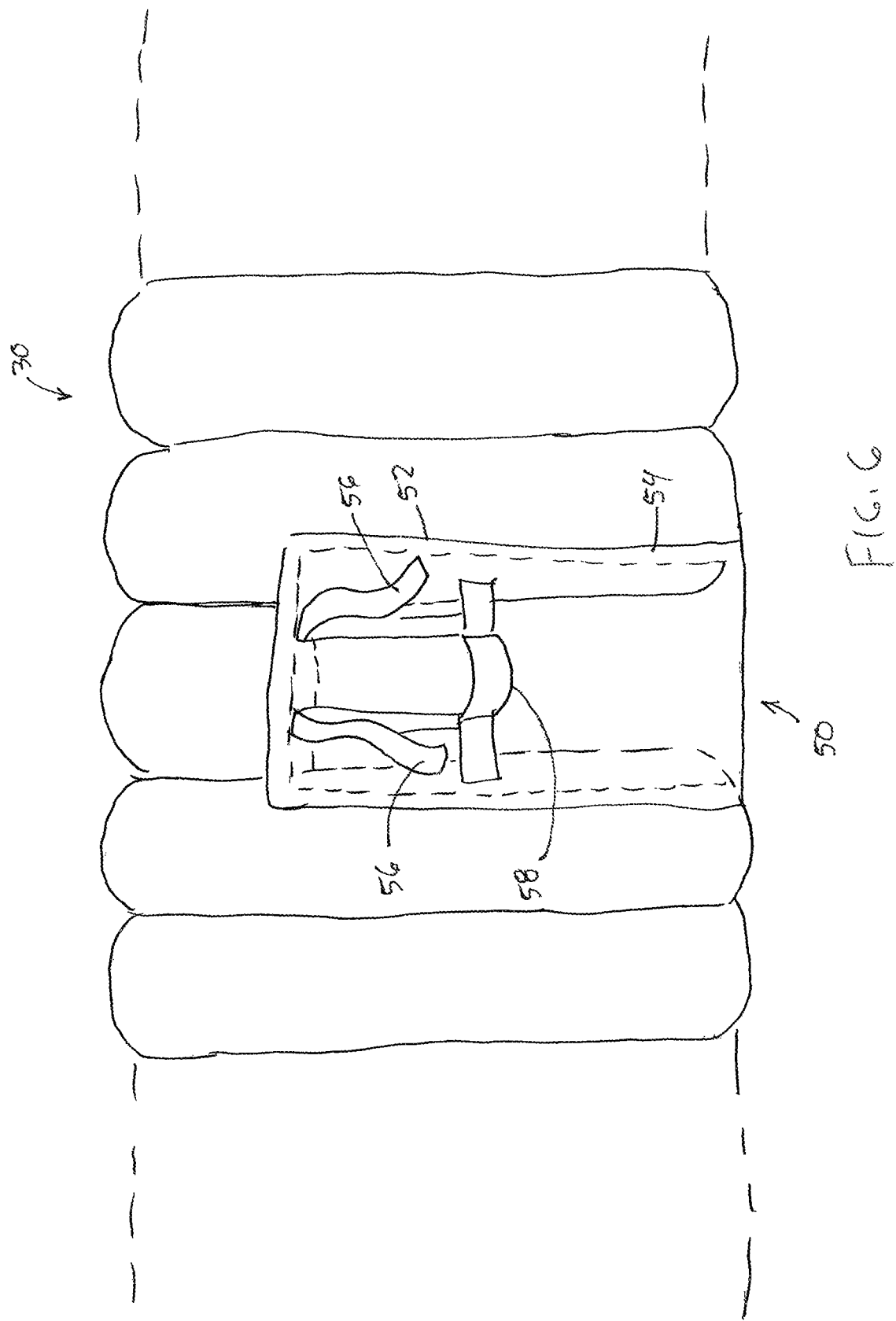
FIG. 6 is a side view of a portion of a module including an emergency exit in accordance with an exemplary embodiment of the present invention.

FIG. 6 is a side view of a portion of an exemplary module 30 including an emergency exit 50. In the preferred embodiment, the emergency exit 50 is formed as an opening in one or more of the vertical side members that form a module wall. The emergency exit 50 can enable a quick exit from the tunnel 10 in an emergency situation. In particular, the emergency exit 50 can provide an intentional escape, for humans or the vehicle 12, by providing a fabric door 52 that covers over the opening in the vertical side member(s) that form the module wall. The fabric door 52 is preferably connected to the perimeter of the opening over the outside of the module wall by a strip 54 of tear-away fastener such as a hook and loop material (i.e., Velcro) to quickly come apart. The strip 54 of hook and loop material can be formed on the fabric door 52 to engage mating portions surrounding the entire perimeter of the opening, as shown in FIG. 6. Alternatively, the strip 54 can be in partial sections around portions of the perimeter. And other types of fasteners can also be employed. The fabric door 52 can also include vertical straps 52 and a horizontal strap 58 which can be pulled on to separate the door 52 from the opening.

Figure 7:
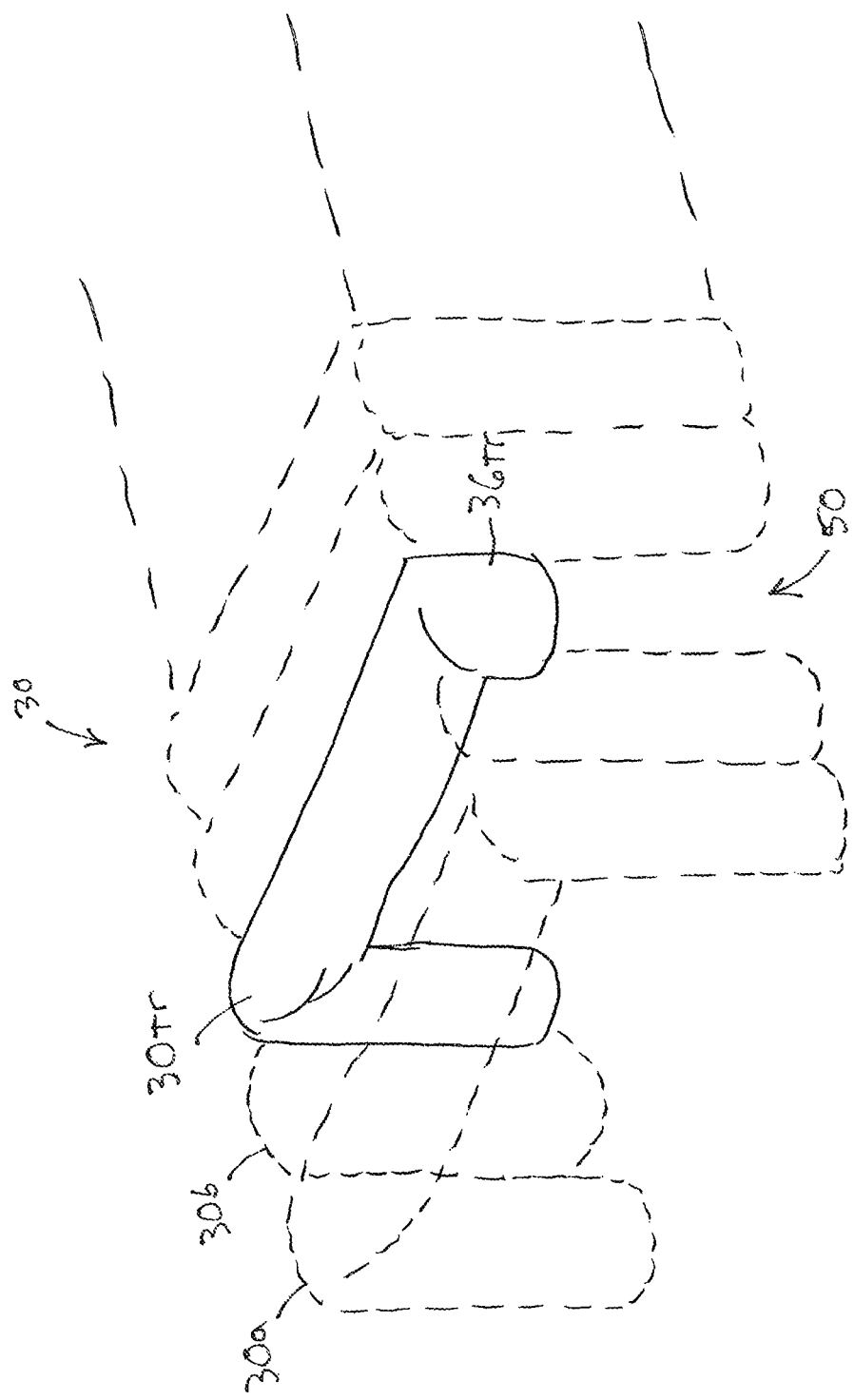
FIG. 7 is a perspective view of a portion of a module showing a truncated arch for admitting an emergency exit in accordance with an exemplary embodiment of the present invention.

As shown in the perspective view of FIG. 7, which depicts a portion of the exemplary module 30 partly shown in phantom, a truncated arch portion 30tr is provided defining the opening for the emergency exit 50. The truncated arch portion 30 1r includes a truncated vertical side support 36tr to define a passageway. While FIG. 7 depicts a truncated right vertical side support 36tr, it is to be appreciated that the emergency exit 50 could be formed on the other side, in which case a truncated left vertical side support 34tr would be used. Also, more than one truncated vertical side support 36r could be used to define a passageway of any desired width, such as the width of the vehicle 12. The opening would be supported by the other arches on either side of the opening.

Figure 8:
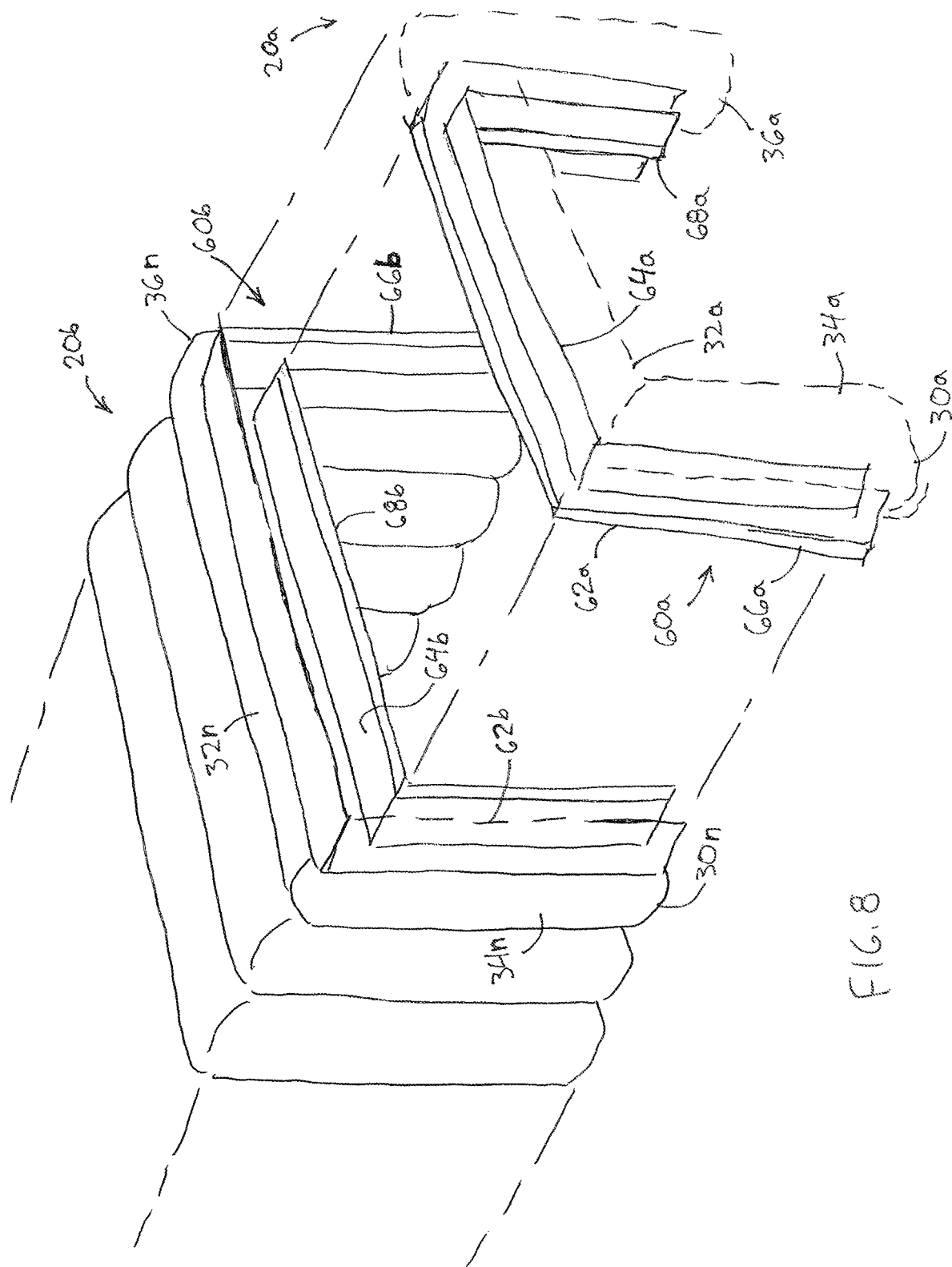
FIG. 8 is a perspective view depicting a securement scheme for connecting two modules in accordance with an exemplary embodiment of the present invention.

The perspective view of FIG. 8 depicts a securement scheme for connecting two adjoining modules 20a, 20b. In this exemplary embodiment, the first module 20a has a first end defined by a first arch component 30a which engages the second module 20a at a complementary second end defined by a final arch component 30n, where, as explained hereinabove, n represents the number of arch components within the module 20b. Each of the adjoining modules 20a, 20b include securements 60a, 60b for joining the respective ends the modules 20a, 20b in a substantially abutting relationship to form the tunnel 10. A first securement 60a is formed on the first arch component 30a and is configured to securely engage a second securement 60*b* formed on the final arch component 30*n* in a mating relationship.

The first securement 60*a* includes a first outer securement 62*a* and a first inner securement 64*a*, which is nested inside the first outer securement 62*a*. Each of the first outer and inner securements 62*a*, 64*a* are respectively formed horizontally along the top member 32*a* and vertically along the side supports 34*a*, 36*a* of the first arch portion 30*a* of the first module 20*a*, as indicated in FIG. 8. The first inner and outer securements 62*a*, 64*a* are configured to mate respectively with a second outer securement 62*b* and a second inner securement 64*b* of the second securement 60*b*. Each are respectively formed horizontally along the top member 32*n* and vertically along the side supports 34*n*, 36*n* of the final arch portion 30*n* of the second module 20*b*. The respective inner and outer securements 62*a*, 62*b*, 64*a*, 64*b* are preferably formed as continuous pieces that span the entirety of the respective arch portions 20*a*, 20*b*, but they can alternatively be sectional pieces that attach respectively to the top members 32*a*, 32*n* and side supports 34*a*, 34*n*, 36*a*, 36*n*.

As indicated in FIG. 8, the first outer securement 62*a* preferably includes a hook and loop fastener portion 66*a* which faces outwardly, away from the interior of the tunnel 10, and mates with a corresponding hook and loop fastener portion 66*b* on the second outer securement 62*b* which faces inwardly, toward the interior of the tunnel 10. In this manner, the first outer securement 62*a* functions as a male component which is received within the second outer securement 62*b* as a female component. Additionally, the first inner securement 64*a* preferably includes a hook and loop fastener portion 68*a* which faces inwardly, toward the interior of the tunnel 10, and mates with a corresponding hook and loop fastener portion 68*b* on the second inner securement 64*b* which faces outwardly, away from the interior of the tunnel 10. In this manner, the first inner securement 64*a* functions as a female component which receives the second inner securement 64*b* as a male component. However, the facing directions of the hook and loop fastener portions 66*a*, 66*b*, 68*a*, 68*b* can be reversed to reverse the male/female engagement or can be arranged in any other manner without departing from the invention. Thus, the securements 60*a*, 60*b* engage and retain the modules 20*a*, 20*b* of the tunnel 10 while maintaining the simulated night environment for operating the vehicle.

Figure 9:
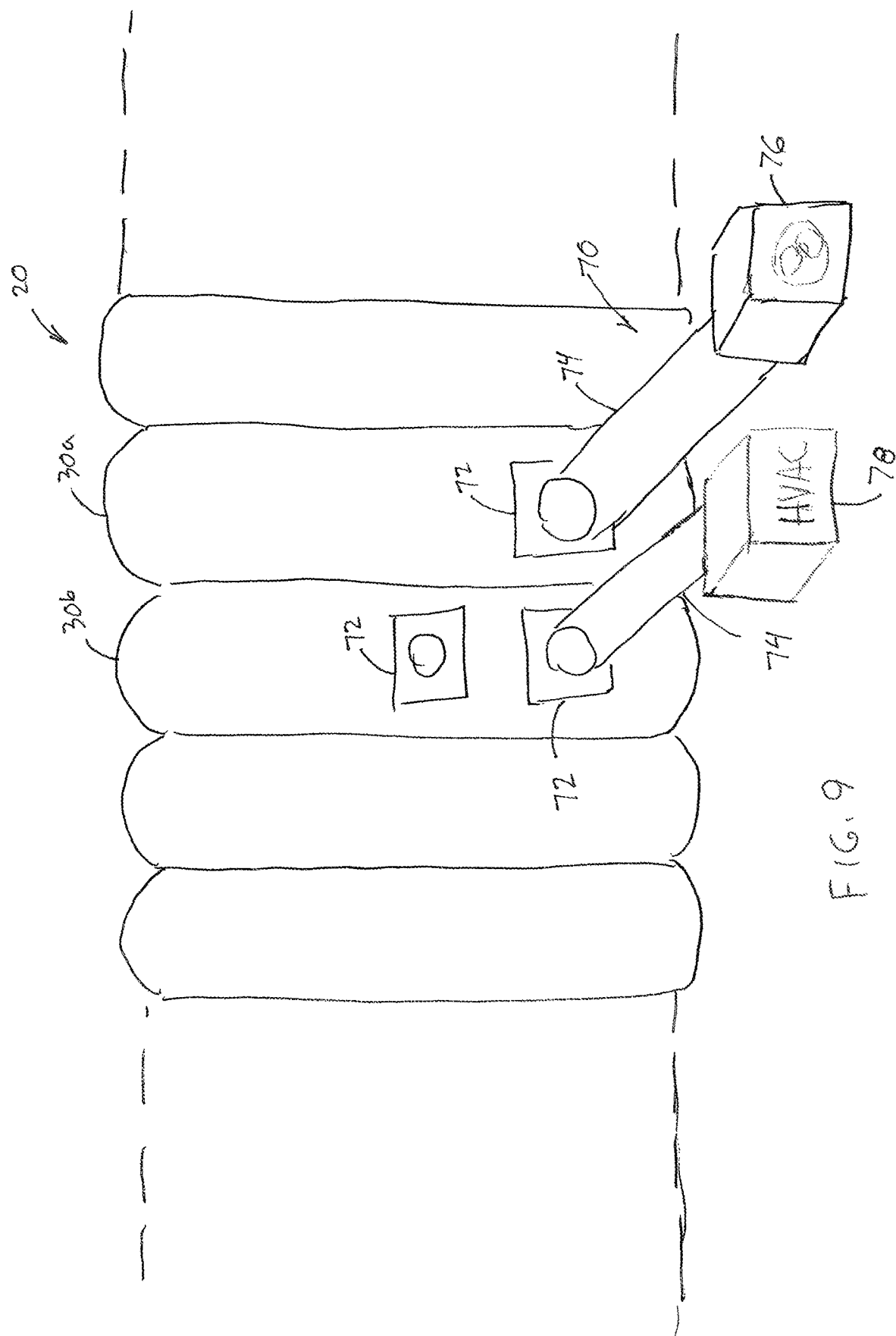
FIG. 9 is a side view of a portion of a module including components of an air circulation system in accordance with an exemplary embodiment of the present invention.

The side view of FIG. 9 shows a portion of an exemplary module 20 including components of an air circulation system 70 for ventilating and circulating air within the interior space of the tunnel. The air circulation system 70 includes one or more ports 72 formed into the sides of the arch components 30*a*, 30*b*. The ports 72 are connected to respective ducts 74 which can feed circulation air into the interior of the tunnel 10. The air circulation system 70 can include an exhaust fan 76 for ventilating vehicle exhaust combustion gas from the interior space of the tunnel 10. In addition to or alternatively, the air circulation system 70 can include an HVAC system 78 for providing interior cooling of the interior space of the tunnel 10.

The exemplary embodiments of FIGS. 1-9, depict a night vision tunnel 10 formed of connected modules 20*a*, 20*b*, . . . 20*n* in which the respective top members 32*a*, 32*b*, . . . 32*n* of each of the respective plurality of inflatable arch components 30*a*, 30*b*, . . . 30*n* is perpendicular to the respective side members 34*a*, 34*b*, . . . 34*n*; 36*a*, 36*b*, . . . 36*n* so as to form a generally rectangular tunnel 10. However, the present night vision tunnel 10 can alternatively be formed of any suitable shape.

Figure 10:
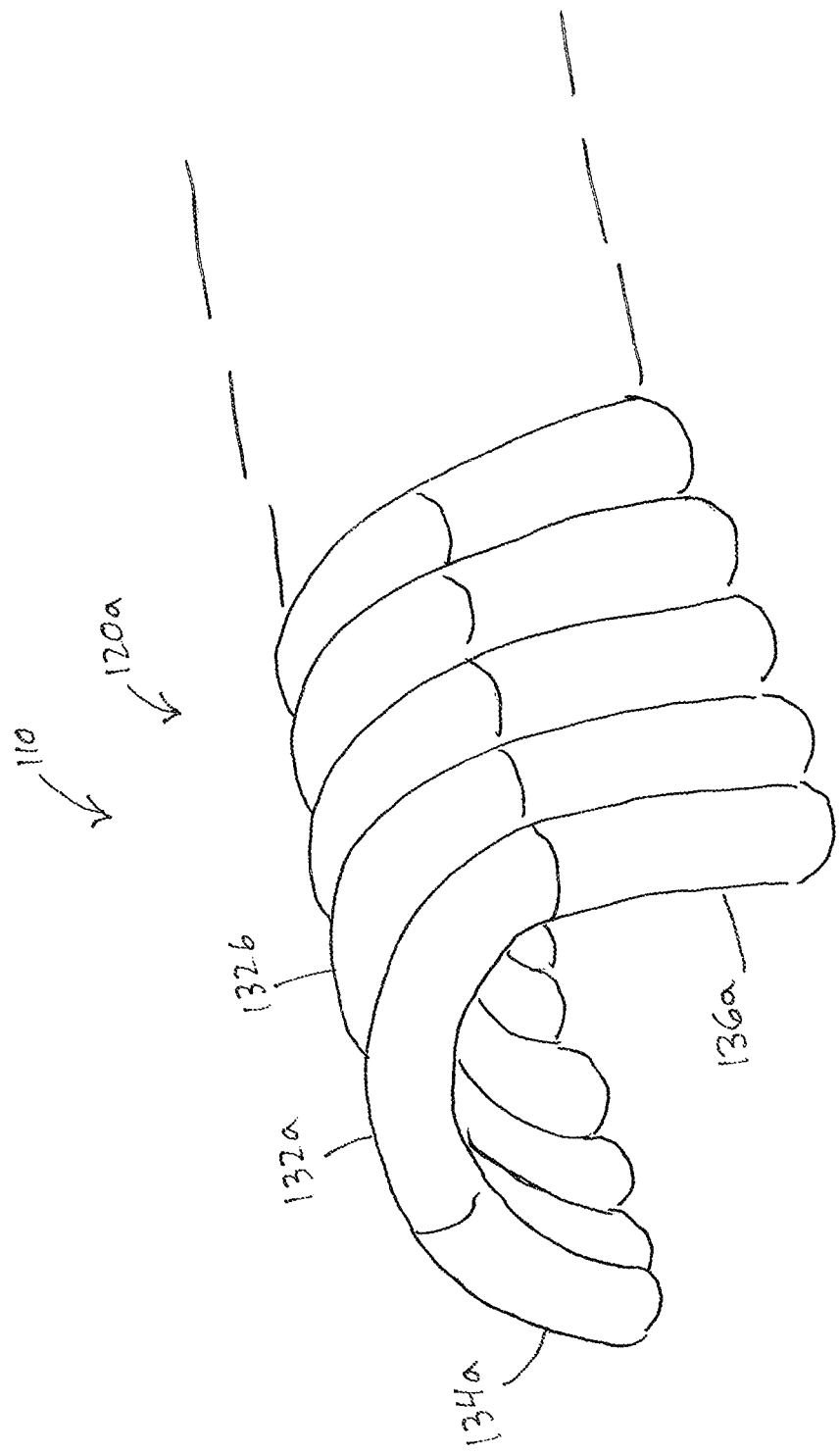
FIG. 10 is a perspective view of an alternative embodiment of the present night vision tunnel in accordance with the present invention.

As shown in the perspective view of FIG. 10, an alternative embodiment of the night vision tunnel 110 can include connected modules defined by an exemplary module 120*a* having a plurality of curved inflatable arch components 130*a*, 30*b*, . . . 30*n*. Such a curved night vision tunnel 10 can have respective top members 132*a*, 132*b*, . . . 132*n* and side members 134*a*, 134*b*, . . . 134*n*; 136*a*, 136*b*, . . . 136*n* formed to have an arcuate shape to define a generally cylindrical tunnel 110, having the general configuration of a Quonset hut. Any other suitably shaped tunnel could be conceived without departing from the present invention.

Figure 11:
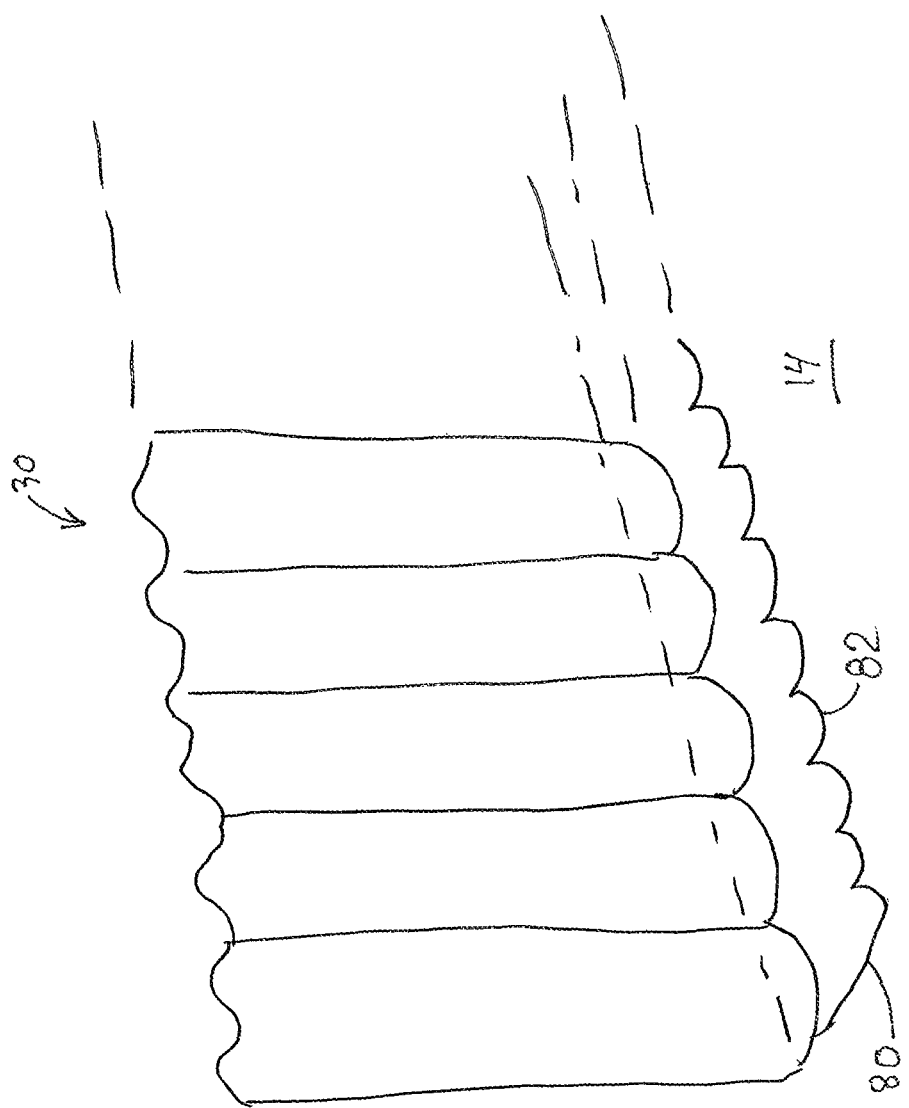
FIG. 11 is a perspective view of a portion of a module including a light barrier in accordance with an exemplary embodiment of the present invention.

FIG. 11 is a perspective view of a portion of an exemplary module 30 including a light barrier 80 formed at an interface between the driving surface 14 and each of the module walls, to keep exterior light out of the darkened interior of the tunnel 10. In the preferred embodiment, the light barrier 80 is formed of drapes of a black, matte-finish fabric, such as Cordura. The light barrier 80 is formed along the bottoms of each of the module walls. The light barrier 80 has scalloped edges 82 at the interface between the driving surface 14 and the respective module wall. In this manner, the light barrier 80 prevents exterior light from entering the darkened interior space of the tunnel 10.

Figure 12:
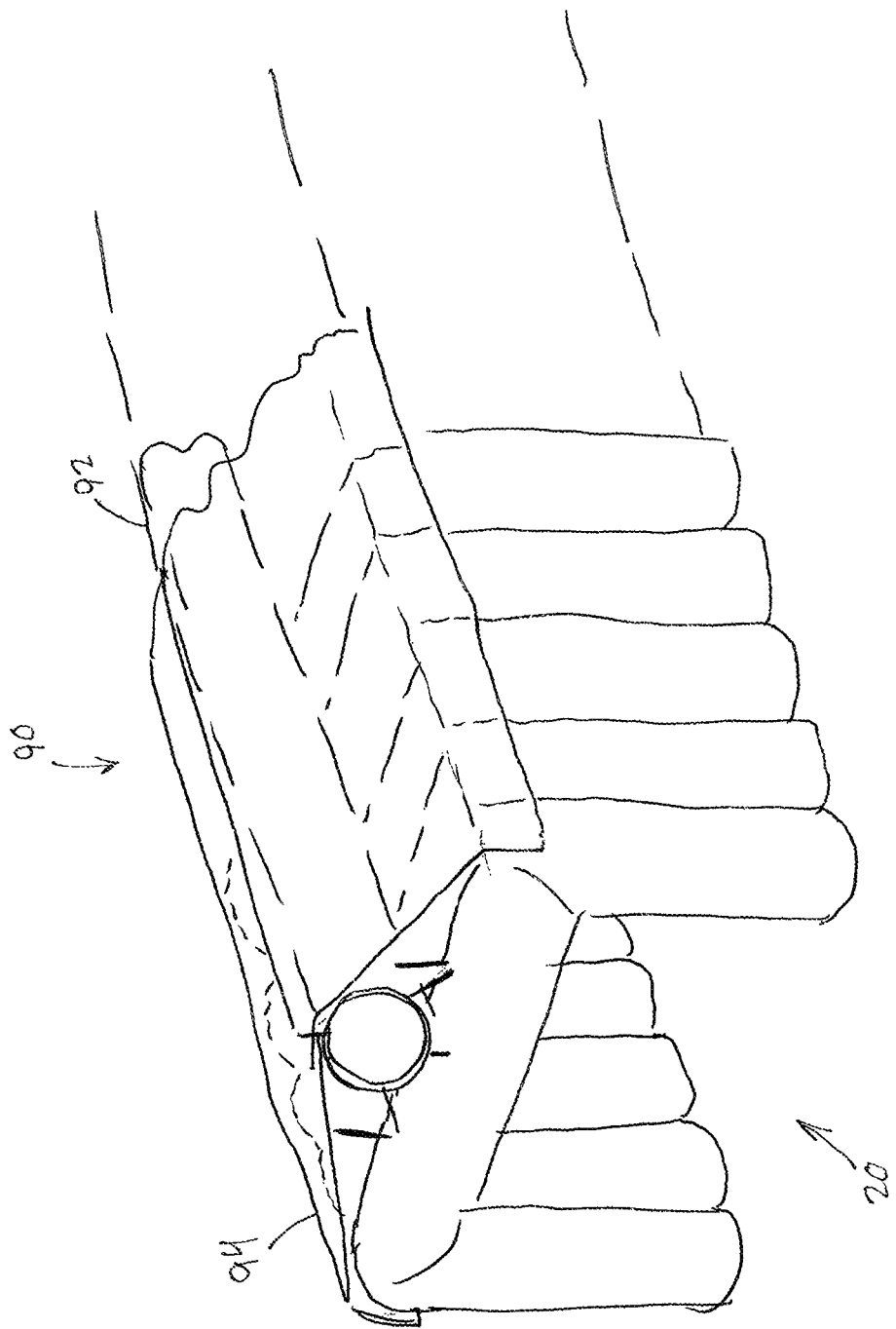
FIG. 12 is a perspective view of a portion of a module with a roof in accordance with an exemplary embodiment of the present invention.

The perspective view of FIG. 12 shows an exemplary module 20 having a sloped roof 90 for shedding rainwater. The sloped roof 90 includes an inflatable tube 92 that is retained along the module top of each of the plurality of modules 20*a*, 20*b*, . . . 20*n*. The inflatable tube 92 is retained onto the exemplary module 20 with a series of straps, which can be an adjustable strap, a bungee cord, or any other such securing component. A cover 94 rests over the inflatable tube 92 and drapes over the respective module walls. The cover 94 can also be secured with straps or the like. In this manner, the present tunnel 10 can be set up in an outdoor location prone to rain and still enable simulated nighttime driving of the vehicle 12.

Figure 13:
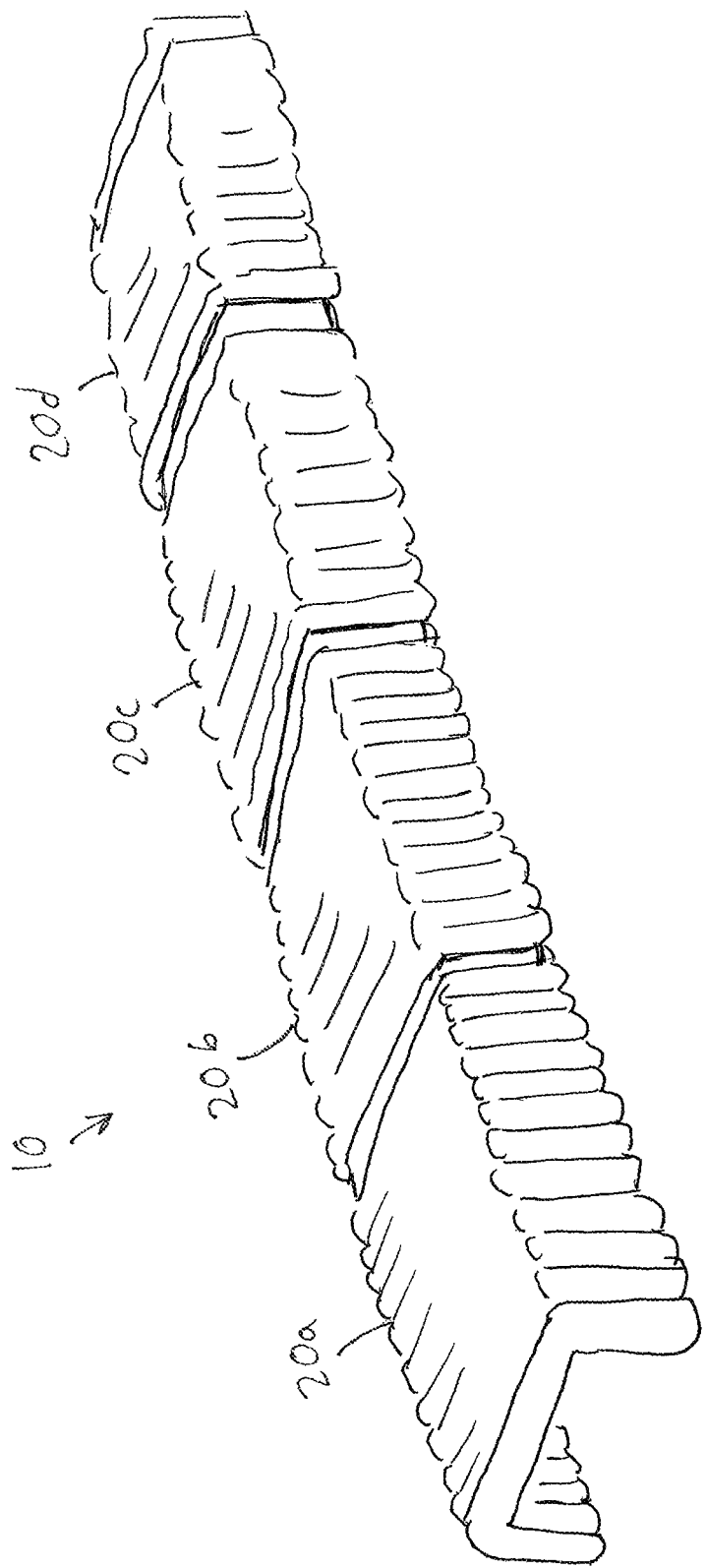
FIG. 13 is a perspective view of an exemplary embodiment of a night vision tunnel formed in a linear direction in accordance with the present invention.

The perspective view of FIG. 13 shows an exemplary embodiment of a night tunnel 10 formed of a plurality of modules 20*a*, 20*b*, 20*c*, 20*d* abutted and connected together in a straight line to form a one-directional tunnel 10 in which straightaway road testing can be performed in a simulated nighttime environment. However, the modular assembly of the present night vision tunnel 10 enables any sort of configuration of modules to be contemplated.

Figure 14:
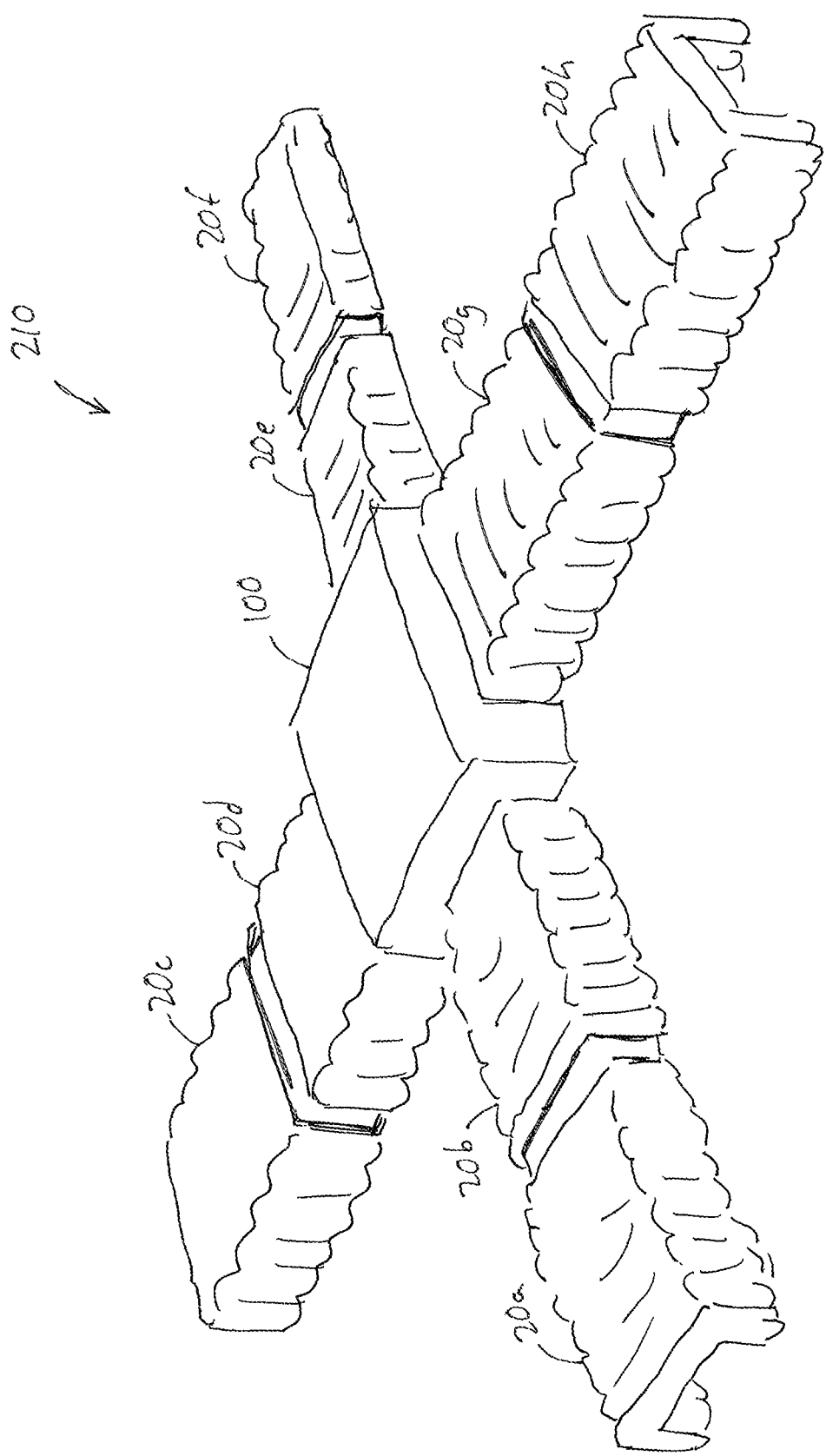
FIG. 14 is a perspective view of an alternative embodiment of a night vision tunnel including a hub and formed in perpendicular directions in accordance with the present invention.

As depicted in the perspective view of FIG. 14, an alternative embodiment of a night vision tunnel 210 can include a hub 100 having multiple sides with openings for joining a plurality of modules at different angles. For example, as shown, the hub 100 can be generally rectangular and can include openings on four different sides to define a multi-directional tunnel having one or more corners for turning the vehicle 12. The alternative night vision tunnel 210, as shown, can connect eight different modules 20*a*, 20*b*, . . . 20*h* on multiple sides and form perpendicular directions for turning. However, the hub 100 can be formed of any shape, including a generally polyhedral shape, and can provide corners for turning at any selected angle.

In implementing the present night vision tunnel, the arch components can be laid out on the driving surface in a desired location and inflated on site. The arch components can be connected into modules before or after inflation, depending on the circumstances. Afterwards, the inflated components can be tied down with straps or the like to the driving surface to prevent displacement due to wind. Individual modules can be moved around manually by setup personnel to configure any desired tunnel length or shape. The night vision tunnel can be set up a desired location for an intended period of time. Afterwards, the arch components can be deflated, and the tunnel can be collapsed and disassembled. The component elements of the tunnel can be loaded onto a truck and shipped to another location to enable setup and testing without incurring the expense of maintaining multiple physical facilities.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof

What is claimed:

1. A portable night vision tunnel for operating a vehicle in a simulated night environment, comprising:
    a plurality of modules arranged in a substantially abutting relationship on a driving surface to form the tunnel having a darkened interior in which the vehicle can be driven;
    wherein each of the plurality of modules comprises:
        a plurality of inflatable arch components, each including a top member supported by respective left and right vertical side supports, and dimensioned to allow a vehicle to pass thereunder, wherein each of the plurality of inflatable arch components include a light-absorptive interior surface for creating the simulated night environment for operating the vehicle;
        a fastener arrangement configured around a periphery of each of the plurality of inflatable arch components, for connecting each of the plurality of inflatable arch components to an adjoining one of the plurality of inflatable arch components to form a single one of the plurality of modules having a module top formed by respective adjoining top members and module walls formed by respective adjoining side supports;
    wherein the tunnel further comprises:
        at least one portal, formed on a respective inflatable arch component at a respective module proximate to an end of the tunnel, for admitting passage of the vehicle into the tunnel while maintaining the simulated night environment for operating the vehicle; and
        an air circulation system for ventilating and circulating air within an interior space of the tunnel;
    wherein the tunnel further comprises a light barrier formed at an interface between the driving surface and each of the module walls, to keep exterior light out of the darkened interior of the tunnel, wherein the light barrier further comprises drapes of a black, matte-finish fabric formed along bottoms of each of the module walls and having scalloped edges at the interface between the driving surface and the respective module wall.

2. The night vision tunnel of claim 1, wherein each of the plurality of modules further comprise securements for joining respective ends the plurality of modules in the substantially abutting relationship to form the tunnel.

3. The night vision tunnel of claim 2, wherein the securements include hook and loop fastener portions for joining respective ends the plurality of modules in the substantially abutting relationship to form the tunnel.

4. The night vision tunnel of claim 1, wherein the top member of the plurality of inflatable components is perpendicular to the side members to form a generally rectangular tunnel.

5. The night vision tunnel of claim 1, wherein the top member and side members of the plurality of inflatable components are arcuate to form a generally cylindrical tunnel.

6. The night vision tunnel of claim 1, wherein each of the plurality of inflatable arch components include a heat-reflective exterior surface for reducing heat when the tunnel is deployed out of doors during daylight.

7. The night vision tunnel of claim 6, wherein the light-absorptive interior surface comprises a black, matte-finish fabric that absorbs light, wherein the heat-reflective exterior surface comprises a grey vinyl material.

8. The night vision tunnel of claim 1, wherein the fastener arrangement comprises zipper portions configured around the periphery of each of the plurality of inflatable arch components, to provide zipper engagement for connecting each of the plurality of inflatable arch components to an adjoining inflatable arch component.

9. The night vision tunnel of claim 1, wherein at least one portal comprises a strip curtain door formed of a black, matte-finish fabric that absorbs light, hanging from the respective inflatable arch component at the respective module at the end of the tunnel, to admit passage of the vehicle into the tunnel while maintaining the simulated night environment for operating the vehicle.

10. The night vision tunnel of claim 1, wherein the air circulation system comprises an exhaust fan for ventilating vehicle exhaust combustion gas from the interior space of the tunnel.

11. The night vision tunnel of claim 1, wherein the air circulation system comprises an HVAC system for interior cooling of the interior space of the tunnel.

12. The night vision tunnel of claim 1, further comprising a sloped roof for shedding rainwater.

13. The night vision tunnel of claim 12, wherein the sloped roof comprises an inflatable tube retained along the module top of each of the plurality of modules, and a cover that rests over the inflatable tube and drapes over the respective module walls.

14. The night vision tunnel of claim 1, further comprising an emergency exit formed in at least one of the module walls.

15. The night vision tunnel of claim 14, wherein the emergency exit is formed of at least one of the plurality of arches having a truncated vertical side support to define a passageway, and further comprising a fabric door connected to a perimeter of the passageway with tear-away fasteners to quickly come apart in an emergency.

16. The night vision tunnel of claim 1, wherein the tunnel is formed of a plurality of modules abutted together in a straight line to form a one-directional tunnel.

17. The night vision tunnel of claim 1, further comprising a hub for joining a plurality of modules at different angles to define a multi-directional tunnel having at least one corner for turning the vehicle.

* * * * *